(12) United States Patent
Hammond et al.

(10) Patent No.: US 7,487,680 B2
(45) Date of Patent: Feb. 10, 2009

(54) SHAKER ASSEMBLY FOR SHAKING A COMPONENT IN ORDER TO INDUCE VIBRATION THERETO

(75) Inventors: Bill A. Hammond, Linden, MI (US); Russell K Davidson, Milford, MI (US)

(73) Assignee: Lear Corporation, Southfield, MI (US)

( * ) Notice: Subject to any disclaimer, the term of this patent is extended or adjusted under 35 U.S.C. 154(b) by 414 days.

(21) Appl. No.: 11/164,433

(22) Filed: Nov. 22, 2005

(65) Prior Publication Data

US 2007/0113657 A1   May 24, 2007

(51) Int. Cl.
*G01M 7/06* (2006.01)

(52) U.S. Cl. .......................................... 73/663; 73/666

(58) Field of Classification Search .................... 73/663, 73/665, 666, 668
See application file for complete search history.

(56) References Cited

U.S. PATENT DOCUMENTS

| 4,748,851 | A | * | 6/1988 | Yoneda | 73/668 |
| 5,516,192 | A | * | 5/1996 | Fukuoka | 297/217.3 |
| 5,650,569 | A | * | 7/1997 | Liu | 73/663 |

* cited by examiner

*Primary Examiner*—John E Chapman
(74) *Attorney, Agent, or Firm*—Brooks Kushman P.C.

(57) ABSTRACT

A shaker assembly for shaking a tested component. The shaker assembly permitting a vibration to be induced within the tested component, such as for use in measuring operating characteristics of the tested component.

10 Claims, 2 Drawing Sheets

SHAKER ASSEMBLY FOR SHAKING A COMPONENT IN ORDER TO INDUCE VIBRATION THERETO

BACKGROUND OF THE INVENTION

1. Field of the Invention

The present invention relates to shaker assemblies configured for shaking a component so as to induce vibration thereto.

2. Background Art

Many component tests require shaking operations to analyze vibration characteristics and capabilities of the components. One common testing application relates to shaking vehicles seats so as to induce vibrations thereto. The vibrations are intended to simulate actual seat usage conditions in a laboratory so that seat operating characteristics may be analyzed, such as to analyze squeaks, rattles, and other sound characteristics and/or material integrity, durability, and the like.

SUMMARY OF THE INVENTION

One non-limiting aspect of the present invention relates to a shaker assembly for shaking a component in order to induce vibration thereto. The shaker assembly including a head for securing the component during a shaking operation, a shaker configured to actuate along a primary axis during the shaking operation, and a resilient connection between the shaker and head for moving the head, and thereby the component, along the primary axis with actuation of the shaker, the resilient connection permitting rocking movement of the head relative to the primary axis.

The resilient connection may include one or more springs connecting the head to the shaker, optionally the resilient connection may include at least fours springs for connecting four different quadrants of the head to the shaker arm.

The shaker assembly may include a dampening member for balancing the shaker against weight of the head and component. The dampening member may be a bladder configured to support the shaker so as to offset the weight of the head and component such that the shaker must generate force to move the head in a first direction and another force to move the head in a second direction along the primary axis.

The shaker assembly may be electrically operable and include a controller for electronically controlling actuation of the shaker in the first and second direction. Optionally, the balancing of the head and component may permit the controller to use a common control strategy to actuate the component independently of the weight thereof.

The bladder may be an air bladder configured to expand and contract in cooperation with actuation of the shaker so as to balance the weight of the head and component during the shaking operation. The bladder may be connected along the primary axis of the shaker.

One non-limiting aspect of the present invention relates to shaker assembly for shaking a component in order to induce vibration thereto. The shaker assembly may include a head for securing the component during a shaking operation, a shaker configured to actuate a shaker arm along a primary axis during the shaking operation, a resilient connection between the shaker arm and head for shaking the head, and thereby the component, the resilient connection permitting rocking movement of the head relative to the shaker, a balancing member connected to the shaker arm an configured to balance the weight of the head and tested component, and an electronic control module configured to control actuation of the shaker arm and weight balancing of the balancing member.

The resilient connection may include one or more springs connecting the head to the shaker arm. Optionally, four springs may be used for connecting four different quadrants of the head to the shaker arm.

The balancing member may be an air bladder and the control module may be configured to control pressurization of the air bladder in order to balance the weight of the head and tested component.

The bladder may be configured to support the shaker so as to offset the weight of the head and component such that the shaker must generate force to move the head in a first direction and another force to move the head in a second direction along the primary axis.

The head may include mounting features for mounting the tested component at a position offset from the shaker.

One non-limiting aspect of the present invention relates to a shaker assembly for shaking a component in order to induce vibration thereto. The shaker assembly may include a head for securing the component during a shaking operation, a shaker having a shaker arm configured to actuate along a primary axis during the shaking operation, a resilient connection having one or more springs for connecting the shaker arm to the head, the resilient connection permitting rocking movement of the head relative to the primary axis, and an air bladder connected to the shaker arm an configured to balance the weight of the head and tested component.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
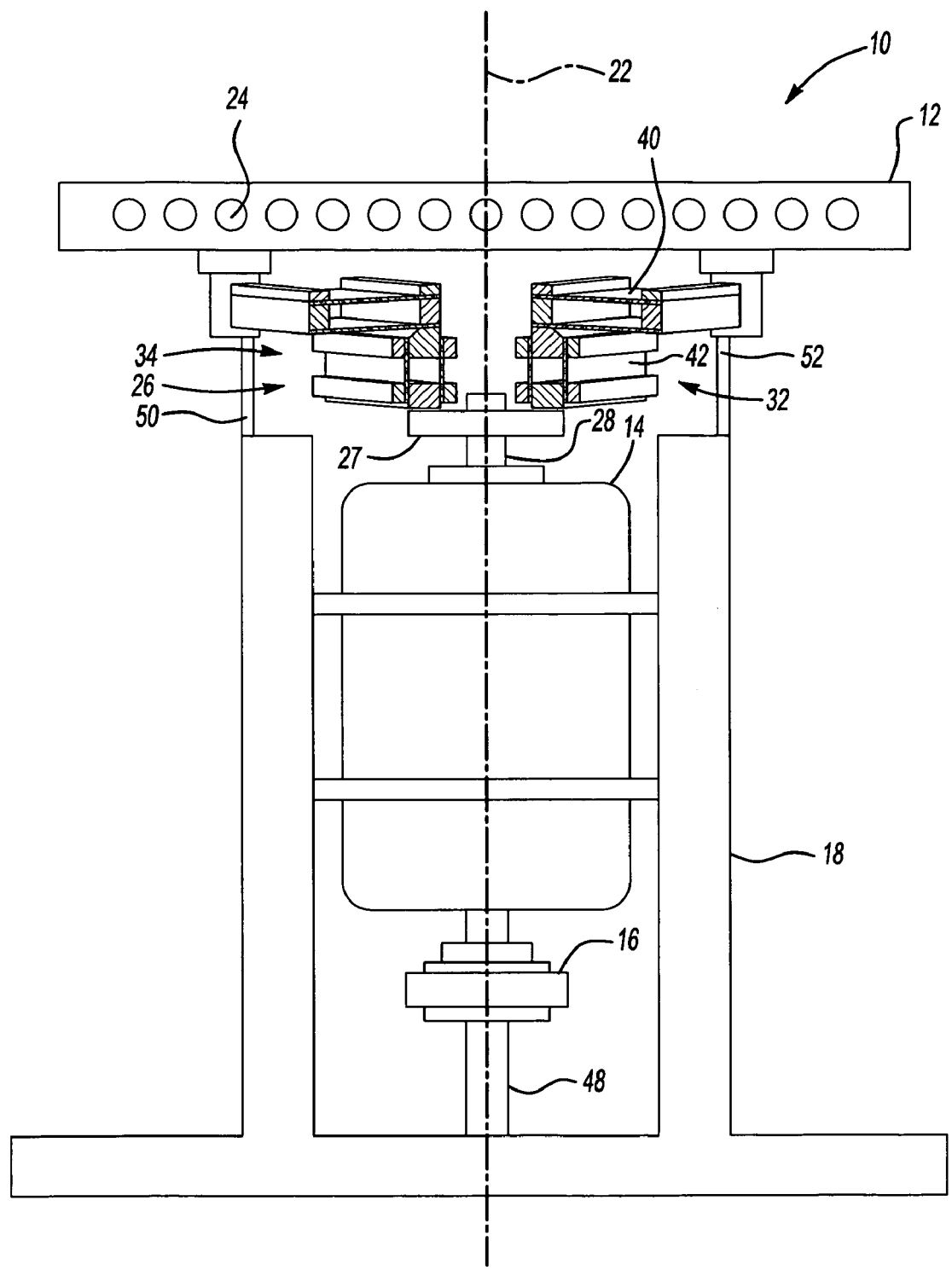
FIG. 1 illustrates a shaker assembly in accordance with one non-limiting aspect of the present invention.

FIG. 1 illustrates a shaker assembly 10 in accordance with one non-limiting aspect of the present invention. The assembly 10 may be used to actuate (shake) a tested component (not shown) in such a manner as to induce vibration thereto. This vibration may then be used to test for squeaks, rattles, and other variables associated with noise and/or to test for material integrity, durability, and the like. The shaker assembly 10, for exemplary purposes, is described with respect to the tested component being a vehicle seat. However, the present invention is not so limited and fully contemplates the use of the shaker assembly in testing any number of components for any number of variables.

The shaker assembly 10 generally includes a head 12, shaker 14, dampening member 16, and base 18. These components are configured to support operations associated with actuating the tested component along a primary axis 22. The primary axis 22, as shown, is generally vertical through a center of the shaker 14. The shaker 14 is configured, as described below in more detail, to actuate the head 12, and thereby the tested component, in an up and down direction along the primary axis 22, respectively referred as a first and second direction.

The head 12 is shown to be generally elongated such that it extends beyond either side of the base 18. This is merely for exemplary purposes and is not intended to limit the scope and contemplation of the present invention. The head 12 may include any number of apertures 24 and fixtures to facilitate securing the tested component thereto. For example, fasteners, such as clamps, bolts, clips, and the like, may be used to securely fastener or otherwise attached/connect the tested component thereto.

Figure 2:
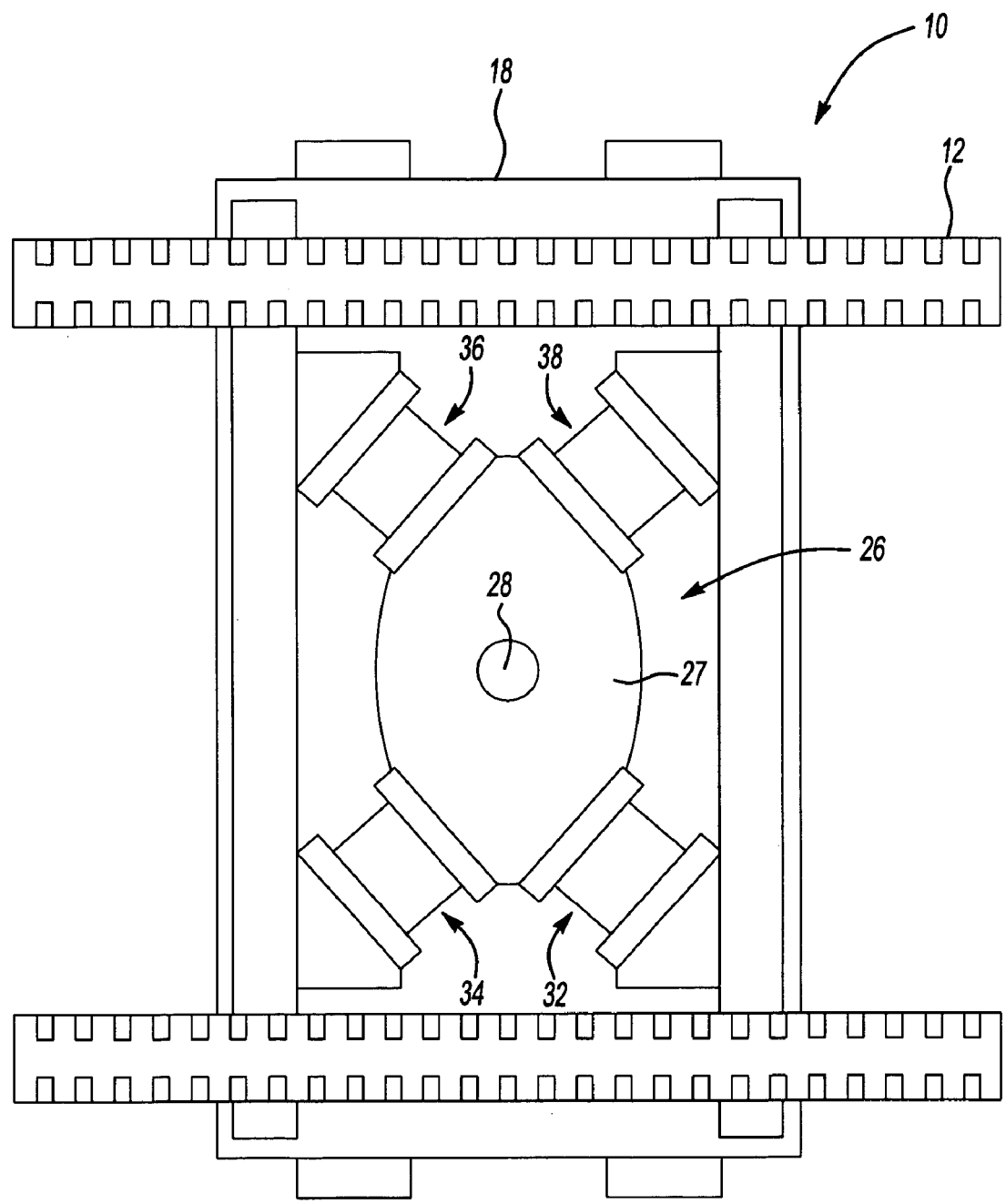
FIG. 2 illustrates a top-side view of the head in accordance with one non-limiting aspect of the present invention.

FIG. 2 illustrates a top-side view of the head 12 in accordance with one non-limiting aspect of the present invention. A resilient connection 26 is provided to connect the head 12 to a collar 27 of an actuator arm 28 of the shaker 14. The resilient connection 26 may comprise any number of resiliently flexible members, such as the illustrated flat-springs 32-38. This resilient connection 26 is preferably sufficient to permit the head to move along the primary axis with actuation of the shaker arm 18 while also permitting some lateral and fore/aft rocking movement of the tested component, i.e. the head 12.

In more detail, the vertical vibration induced during a shaking operation (i.e., during movement of the head along the primary axis of the shaker) can trigger secondary vibrations within the tested component that cause the tested component to rock the head 12 in a lateral and/or fore/aft direction. The resilient connection 26 between the head 12 and shaker arm 18 allows the head, and thereby the tested component, to ring in this manner. This ringing allows the shaker assembly 10 to better approximate deflection shapes to which the tested component is likely to experience in actual use.

For example, in actual use, the seat is likely to experience vibration in six directions, with the possibility of each direction introducing various noise defects (squeaks, rattles, etc.) and/or integrity defects. The shaker assembly 10 of the present invention allows the tested component to essentially rock in all six directions such that it provides a better testing estimate than shaker assemblies that rigidly connect the head 12 to the shaker arm 28. In the past, such six direction movement required actuators having capabilities to actuate in six directions, with larger and more expensive equipment.

As shown, the resilient connection 26 includes four separate flat-spring assemblies 32-38 for connecting the head to the shaker arm and to permit the multi-axis movement. Each of the assemblies may include a horizontal spring 40 and vertical spring 42 and they may each be may be separately spaced to correspond with different quadrants of the head 12 such that the head 12 is free to twist, bend, shake, or otherwise move in those directions. The spring assemblies 32-38, as one skilled in the art will appreciate, are generally flexible in all directions such that they provide the head freedom to move in six directions.

The spring assemblies 32-38 are illustrates for exemplary purposes and are not intended to limit the scope of the present invention. The present invention fully contemplates other spring arrangements and is not intended to be limit to such two-pieces, horizontal and vertical spring arrangements. Advantageously, the illustrated arrangement may be used to adjust the height of the head 12 relative to the base 16 and shaker arm 28 by simply adding additional vertical springs 42 to one or more of the assemblies 32-38, i.e., by stacking the springs. Similarly, the horizontal positioning may be adjusted by adding horizontal springs 40.

The resilient connection 26 also allows securing of the tested component to positions on the head 12 that are offset from the primary axis 22. This ability can be advantageous in inducing different vibrations, deflection shapes, and resonant frequencies within the tested component. Some testing requirements may require such capabilities and testing conditions. Rigid connections between the head 12 and shaker arm 28 would make such offsets difficult and/or impossible given the resulting stresses experienced by the shaker arm with the rigid connection.

The shaker arm 28 may be connected to the dampening member 16 to support the movement thereof. In more detail, the shaker arm 28 may be electromagnetically driven along the primary axis and supported by the dampening member 16 during such movement, such as by varying voltage levels and/or current flow through electrical coils (not shown) included within the shaker 14.

The dampening member 16 may be included to support a lower end of the shaker arm 28, and thereby, share the load on the upper end thereof. The load (weight) on the upper end corresponds with the weight associated with the head 12 and tested component, and other features that may be included thereon, such as fasteners, clamps, etc. Optionally, the force supplied by the dampening member 16 may correspond with the load on the shaker arm 28 such that the shaker arm 28 is essentially at equilibrium or otherwise free-floating during a shaking operation and movement of the shaker arm 28.

For example, the dampening member 28 may be an bladder (fluid, gas, etc.), shock, bellow, vibration isolator, or other feature having the ability to adjustably apply force to the lower end of the shaker arm 28 so that it can be adjusted to the weight supported by the shaker arm 28 and controlled or otherwise operated to support the weight, such as by controlling the pressurization thereof. In more detail, the dampening member 16 may be secured at one end to the lower end of the shaker arm 28 and at another end to a rod 48 connected to the base 18 such that it must expand and contract with the stroke of the shaker arm 28.

An electronic control module (not shown) may be included to electronically control movement of the shaker arm 28. Optionally, if the dampening member is an air bladder, the pressurization of the bladder may also be controlled such that it is expanded and contracted with movement of the shaker arm 28 and continuously correlated to a weight thereon. This pressurization may be electronically controlled with the electronic control module and/or mechanically through valves such that the net weight on the shaker arm 28 is at or near zero during the shaking operation, i.e. for all movements of the shaker arm 28 the bladder 16 is substantially supporting the weight of the head and tested component.

In this manner, the shaker arm 28 is essentially free-floating within the shaker 14 at all times such that electrical stimulation (force) is required to move the shaker arm 28 upwardly and another electrical stimulation is required to move the shaker arm 28 downwardly. Accordingly, the electronic control module can be used to electronically control actuation of the shaker arm 28 by simply cycling through different voltage levels. For example, a sinusoidal control pattern varying between positive and negative voltages may be used to move the shaker arm 28 upwardly (positive voltage) and to move the shaker arm 28 downwardly (negative voltage).

Advantageously, the free-floating shaker arm 28 allows the control module to control the shaking operation independently of the weight of the head 12 and tested component. Once balanced, the same control strategy can be used for virtually any head 12 and tested component combination as the weight thereof is irrelevant to movement of the shaker arm 28. Of course, the control of the dampening member 16 must be continuously controlled by the control module or by design in order to maintain proper support of the shaker arm 28.

One or more spacers 50-52 may be included between the head 12 and base 18 to support the head 12 when the shaker assembly 10 is inactive. The spacers 50-52 may comprise any suitable rigid material having properties sufficient to support the weight of the head 12. The spacer height may be selected to correspond with a desired positioning of the shake arm 28 within the shaker 14, i.e. a preferred starting point of the shaker arm 28 within the shaker 14. In this manner, the spacers 50-52 may be used to lessen the amount of weight on the dampening member and/or to provide proper alignment of the shaker arm 28 when no electrical stimulation is applied thereto.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed is:

1. A shaker assembly for shaking a component in order to induce vibration thereto, the shaker assembly comprising:
    a head for securing the component during a shaking operation;
    a shaker configured to actuate a shaker arm along a primary axis during the shaking operation;
    a resilient connection between the shaker arm and head for shaking the head, and thereby the component, the resilient connection permitting rocking movement of the head relative to the shaker;
    a balancing member connected to the shaker arm and configured to balance the weight of the head and tested component; and
    an electronic control module configured to control actuation of the shaker arm and weight balancing of the balancing member.

2. The shaker assembly of claim 1 wherein the resilient connection includes one or more springs connecting the head to the shaker arm.

3. The shaker assembly of claim 2 wherein the resilient connection includes at least four springs for connecting four different quadrants of the head to the shaker arm.

4. The shaker assembly of claim 1 wherein the balancing member is an air bladder, and wherein the control module is configured to control pressurization of the air bladder in order to balance the weight of the head and tested component.

5. The shaker assembly of claim 4 wherein the bladder is configured to support the shaker so as to offset the weight of the head and component such that the shaker must generate force to move the head in a first direction and another force to move the head in a second direction along the primary axis.

6. The shaker assembly of claim 1 wherein the head includes mounting features for mounting the tested component at a position offset from the shaker.

7. A shaker assembly for shaking a component in order to induce vibration thereto, the shaker assembly comprising:
    a head for securing the component during a shaking operation;
    a shaker having a shaker arm configured to actuate along a primary axis during the shaking operation;
    a resilient connection between the shaker arm and head that allows the head to vibrate in six directions when the shaker is actuated; and
    a bladder connected to the shaker arm that continuously adapts and amount of force applied to the shaker arm when the shaker arm is actuated so that the amount of force applied by the bladder to the shaker arm equals the weight of the head and tested component.

8. The shaker assembly of claim 7 wherein the resilient connection includes at least four springs for connecting four different quadrants of the head to the shaker arm.

9. The shaker assembly of claim 7 further comprising an electronic control module configured to control pressurization of the air bladder in order to balance the weight of the head and tested component.

10. The shaker assembly of claim 7 wherein the shaker must generate force to move the head in a first direction and an equal amount of force to move the head in a second direction.

* * * * *